United States Patent
Williams (10) Patent No.: US 11,084,321 B2
(45) Date of Patent: Aug. 10, 2021

(54) ADJUSTABLE SKULL MOUNTING BRACKET

(71) Applicant: Rafe Williams, Kooskia, ID (US)

(72) Inventor: Rafe Williams, Kooskia, ID (US)

(73) Assignee: Top Rack LLC, Kooskia, ID (US)

( * ) Notice: Subject to any disclaimer, the term of this patent is extended or adjusted under 35 U.S.C. 154(b) by 90 days.

(21) Appl. No.: 16/530,410

(22) Filed: Aug. 2, 2019

(65) Prior Publication Data

US 2020/0039284 A1 Feb. 6, 2020

Related U.S. Application Data (60) Provisional application No. 62/714,307, filed on Aug. 3, 2018.

(51) Int. Cl.
*G09B 23/36* (2006.01)
*B44C 5/02* (2006.01)
*F16M 13/02* (2006.01)

(52) U.S. Cl.
CPC .............. *B44C 5/02* (2013.01); *F16M 13/02* (2013.01)

(58) Field of Classification Search
None
See application file for complete search history.

(56) References Cited

U.S. PATENT DOCUMENTS

| | | | |
|---|---|---|---|
| 6,719,260 B1* | 4/2004 | Hart | A47G 1/168 248/466 |
| 8,641,001 B2* | 2/2014 | Heffernon | F16M 13/02 248/224.8 |
| 9,626,881 B1* | 4/2017 | Herron | B44C 5/02 |
| RE47,603 E * | 9/2019 | Shaw | B44C 5/02 |
| 2011/0031363 A1* | 2/2011 | Shaw | B44C 5/02 248/220.22 |
| 2011/0036959 A1* | 2/2011 | Raby | G09B 23/36 248/282.1 |

* cited by examiner

*Primary Examiner* — Sunit Pandya
(74) *Attorney, Agent, or Firm* — Hogaboam Law Offices, PLLC; Romney J. Hogaboam (57) ABSTRACT

An apparatus for mounting a vertebrate skull using hooks which are inserted into the openings on either side of the skull formed by the jugal, palatine, alisphenoid, and squamosal bones and a post which supports the basioccipital bone.

14 Claims, 10 Drawing Sheets

ADJUSTABLE SKULL MOUNTING BRACKET

CROSS-REFERENCE TO RELATED APPLICATIONS

This application claims priority to provisional application 62/714,307 filed on Aug. 3, 2018. Specifically, the applicant asserts claims 1-4, 6-8, 10-12, and 14 are supported by the disclosure of provisional application 62/714,307.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

REFERENCE TO A "SEQUENCE LISTING," A TABLE, OR A COMPUTER PROGRAM LISTING APPENDIX SUBMITTED ON COMPACT DISC AND AN INCORPORATION-BY-REFERENCE OF THE MATERIAL ON THE COMPACT DISC

Not Applicable

STATEMENT REGARDING PRIOR DISCLOSURES BY AN INVENTOR OR JOINT INVENTOR

Not Applicable

BACKGROUND OF THE INVENTION

This invention relates generally to an apparatus for securing and displaying a skull. Hunters often display samples of animals they have harvested. People often display animal skulls for decorative purposes. People often hang animal skulls for educational purposes, such as in wildlife exhibits. Hanging display techniques vary widely from running wire through eye sockets and hanging that wire from a nail on a wall to more complicated devices having clamping mechanisms, ball sockets, and swinging arms to allow precise control over the orientation of the skull.

A "skull mount," also referred to as a "European mount," "western skull mount," or "western mount," is a common way to display a skull. With a skull mount, the skull is removed from the spinal cord. The horns or antlers, if any, are frequently left attached to the skull. All muscle and other flesh tissue is removed from the skull. Any desired treatment is applied and then the skull and horns or antlers can then be displayed.

The skull mount technique is popular for a number of reasons. First, a skull mount is compact; it takes much less space and weighs much less than a shoulder mount. Second, a skull mount is flexible; it can be displayed on a wall, on a table, or in other ways less suited to larger shoulder mounts. Third, a skull mount is relatively inexpensive often costing approximately one-fourth to one-tenth the price of a shoulder mount. Fourth, preparing a skull mount is a relatively easy process and can often be performed by people without extensive taxidermy training. Fifth, preparing a skull mount is fast and can often be performed in one or two days.

BRIEF SUMMARY OF THE INVENTION

The invention is a mounting bracket which is generally two prongs and one post protruding from a body. The body is configured to be attached to a wall or other surface. The body may be attached directly to the surface or attached indirectly with a wedge between the body and surface to adjust the angle of the body relative to the surface. The prongs are curved upward to prevent an item from sliding off the end. The post may be fitted with various attachments to fit different skulls.

DETAILED DESCRIPTION OF THE INVENTION

The present invention is a mounting bracket configured to support and display a skull. The bracket is comprised of a body and three support members. The body of the bracket is comprised of three body members: a back body member 102, an inner body member 202, and a front body member 302. The three body members each have two mounting holes 104, 204, and 304 which align when the three body members 102, 202, and 302 are stacked with the outer edges aligned, a mounting screw can pass through a respective set of holes to secure the body of the bracket to a wall or other surface.

Figure 1:
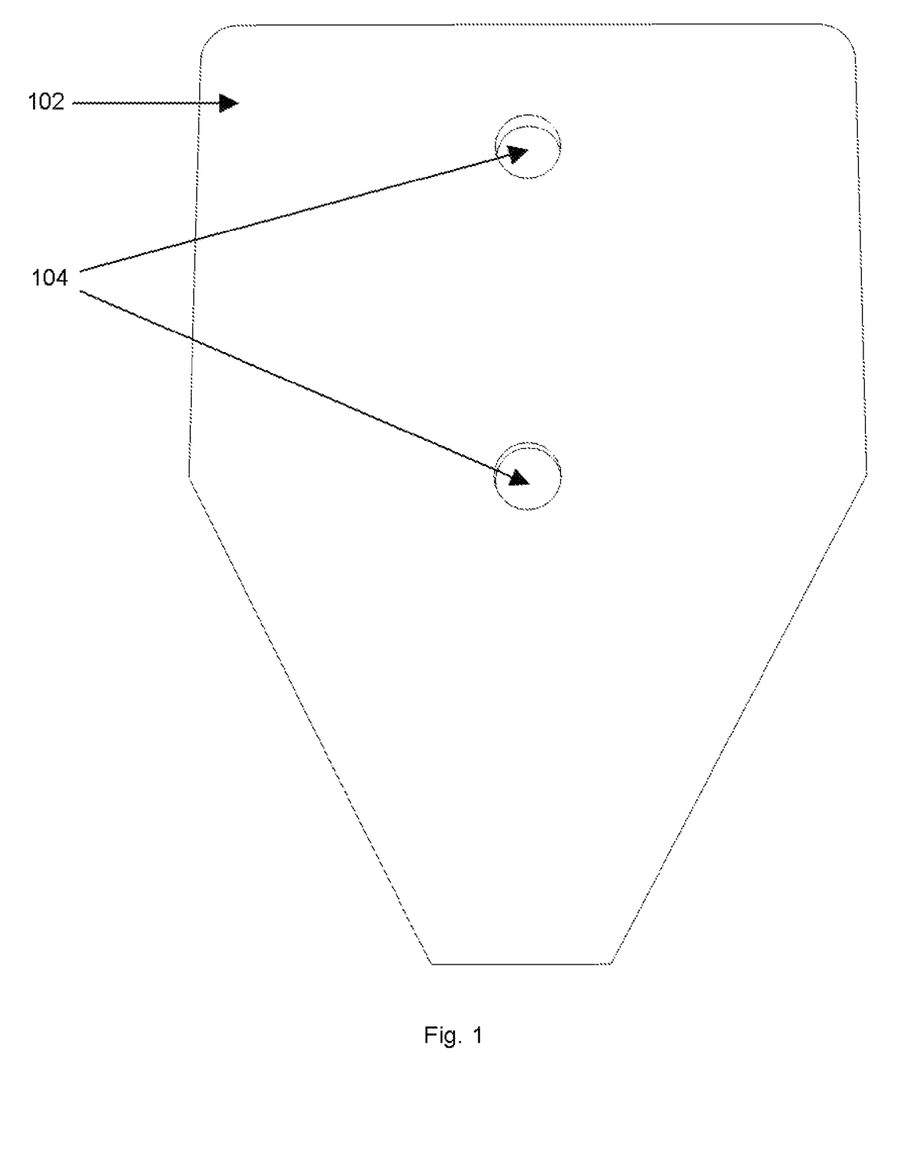
FIG. 1 is a perspective view of a back body member of the body of the bracket.
Figure 2:
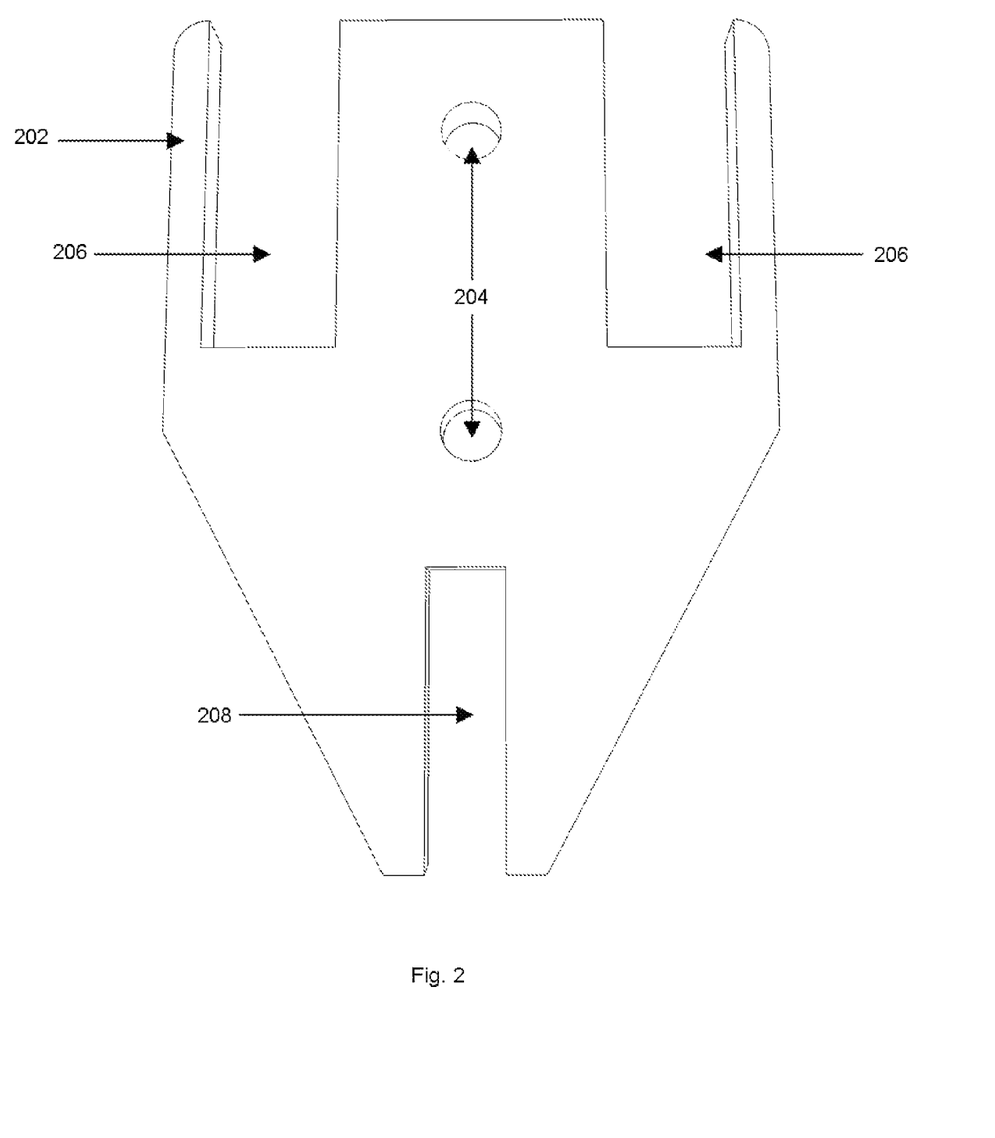
FIG. 2 is a perspective view of an inner body member of the body of the bracket.
Figure 4:
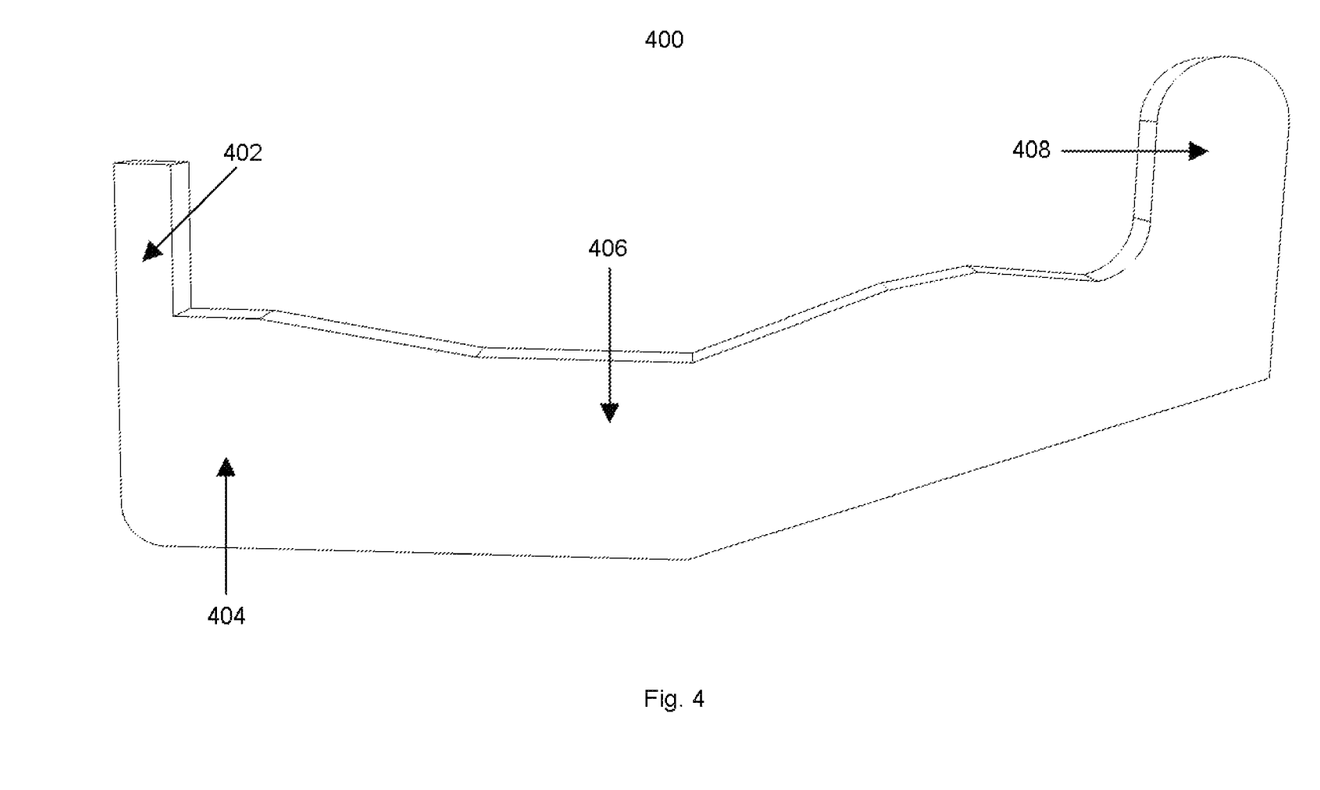
FIG. 4 is a perspective view of a top support member.
Figure 5:
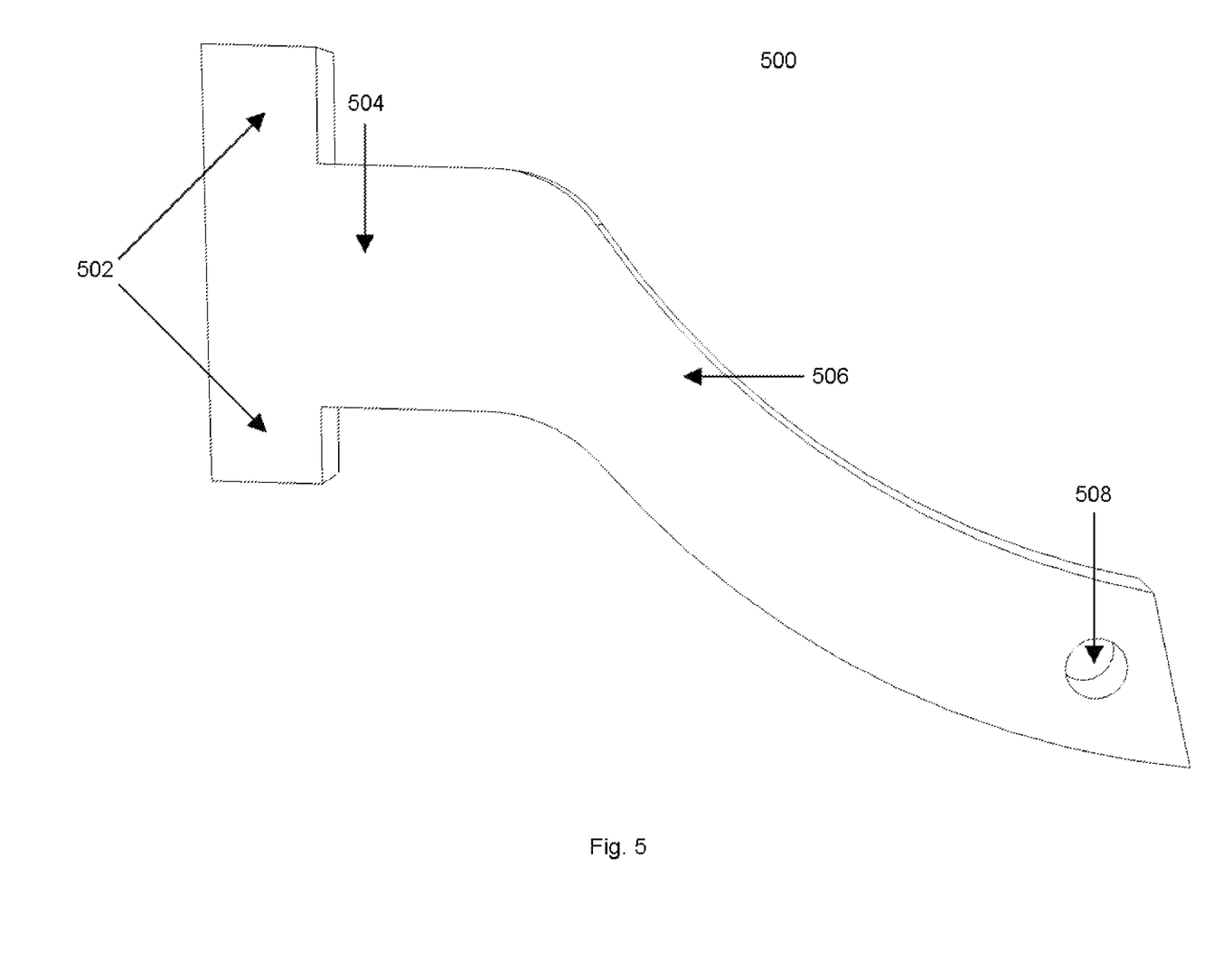
FIG. 5 is a perspective view of a bottom support member.

The inner body member further comprises regions 206 and 208 adapted to accept portions of the support members. In a preferred embodiment, the regions 206 and 208 are significantly wider than the thickness of the support members such that captive regions 402 and 502 of support members 400 and 500 can move horizontally within regions 206 and 208.

Figure 3:
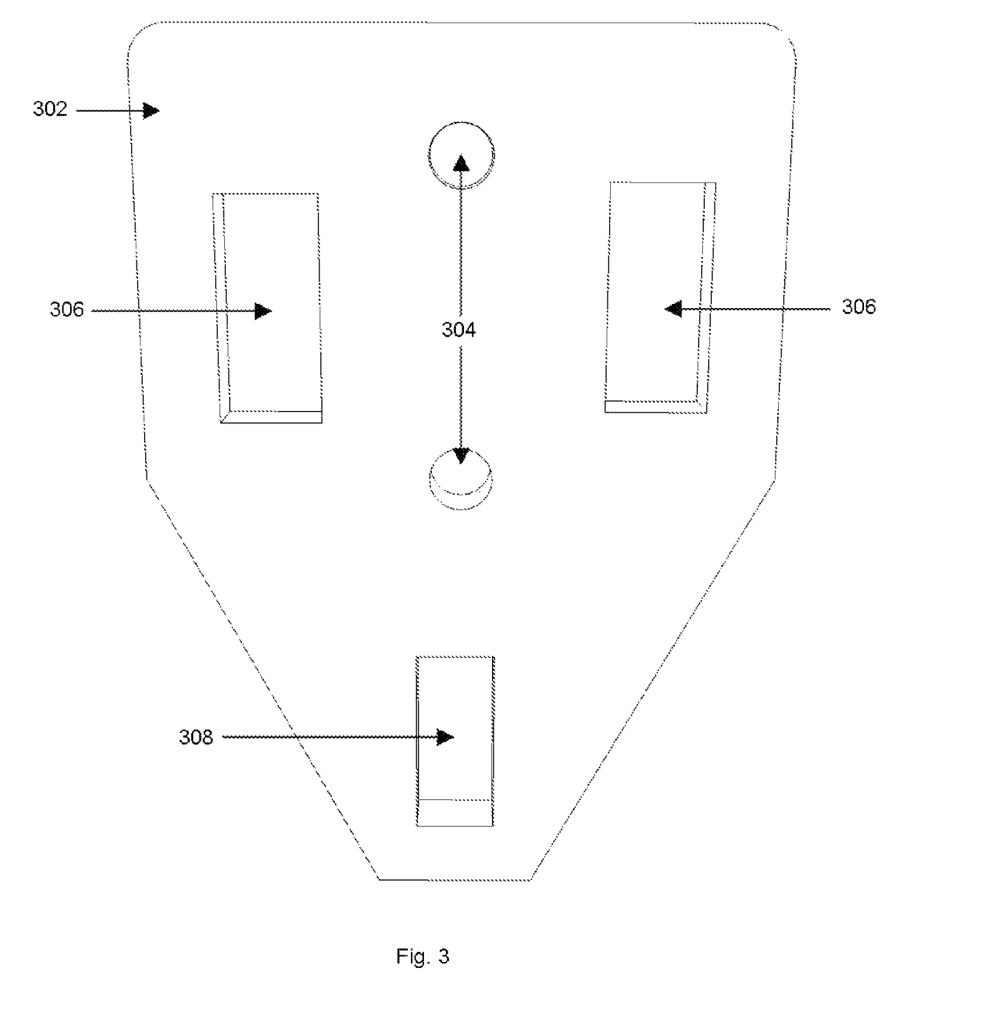
FIG. 3 is a perspective view of a front body member of the body of the bracket.

The front body member further comprises three holes 306 and 308 configured to accept portions of the support members. In a preferred embodiment, holes 306 and 308 are slightly wider than the thickness of the support members. In a preferred embodiment, holes 306 are sufficiently wider than than the thickness of the support members that the support members may pivot within the holes. In a preferred embodiment, hole 308 is only slightly wider than the width of the support member minimizing the degree to which the support member may pivot.

The three support members comprise two substantially similar top support members 400 and one bottom support member 500. The top support members 400 comprise four distinct features: a captive region 402, a pivot region 404, a lateral region 406, and a skull retention feature 408. The captive region has a height greater than the holes 306 through which they pass when assembled thereby preventing the top members 400 from being removed from the body of the bracket when assembled. The pivot region 404 is approximately the size of, through slightly smaller than, hole 306. The lateral region 406 extends away from the pivot region 404. The skull retention feature 408 preferably extends upward from the lateral region 406.

Figure 6:
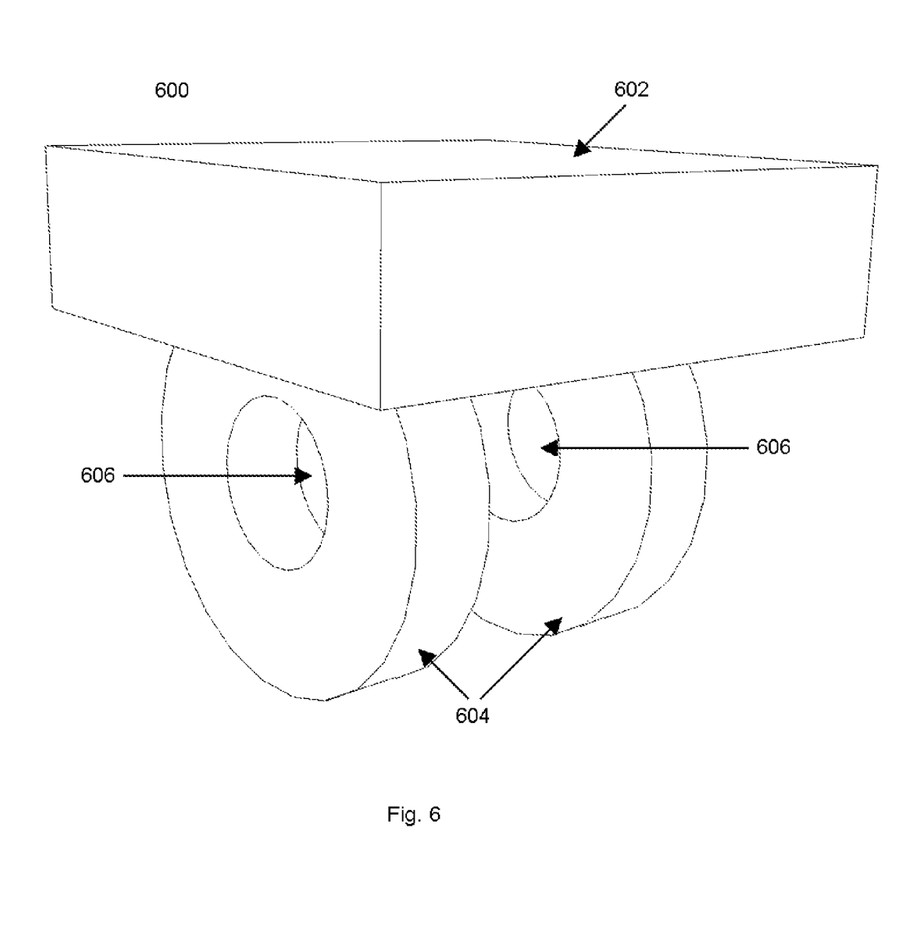
FIG. 6 is a perspective view of a bottom support leveling member.
Figure 7:
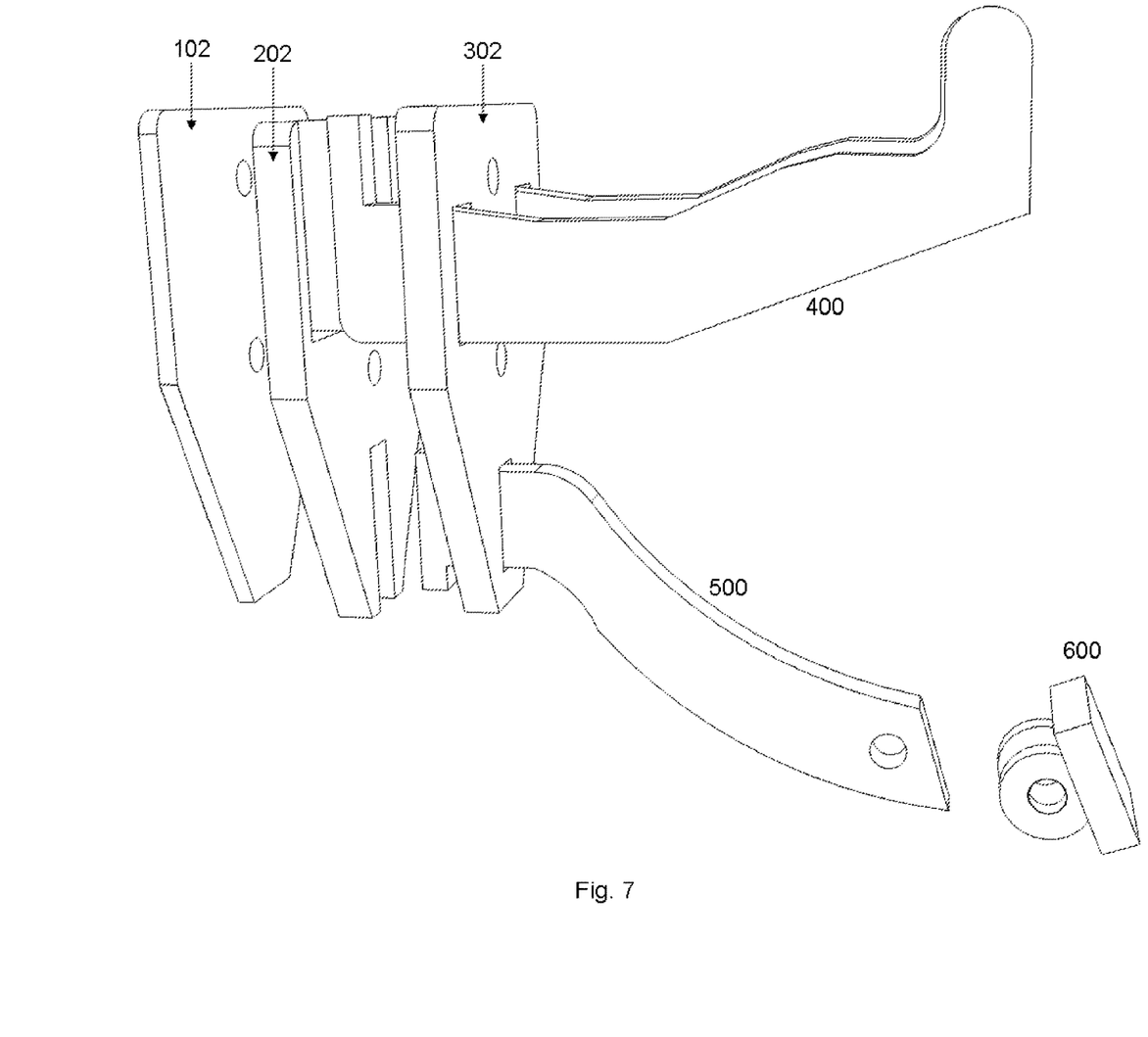
FIG. 7 is an exploded perspective view of the mounting bracket.

The bottom support member 500 comprises four distinct features: a captive region 502, a pivot region 504, an extension region 406, and a pivot hole 508. The captive region 502 has a height greater than the hole 308 through which it passes when assembled thereby preventing the bottom support member 500 from being removed from the body of the bracket when assembled. The pivot region 504 is approximately the size of, through slightly smaller than, hole 308. The extension region 506 extends away from the pivot region 504. The pivot hole 508 is located at approximately the end of extension region 506. The pivot hole 508 is configured such that a skull leveling member 600 may be attached to the pivot hole 508.

The skull leveling member 600 is preferably rotatably attached to the bottom support member 500. The skull leveling member 600 is comprised of: a skull contact member 602 and a bottom support attachment member 604. In a preferred embodiment, the bottom support attachment member 604 is comprised of a hole configured to attach the bottom support attachment member 604 to pivot hole 508 of the bottom support member 500.

The top support members 400 are sized and oriented to fit into openings on either side of a skull formed by the jugal, palatine, alisphenoid, and squamosal bones. The width of opening 206 allow the distance between the skull retention features 408 at the end of the top support members 400 to vary to accommodate a range of skull sizes. Although one size mounting bracket may fit a variety of skull sizes, a variety of brackets bracket sizes may be necessary to support a wider range of skull sizes.

The bottom support member 500 extends from the front of the mounting bracket. When a skull is hung from the top support members 400 and tipped forward, the center of gravity is both farther from the base and above the points at which the skull rests on the top support members. The elevated and forward center of gravity cause the lower portion of the skull to rotate back toward the mounting bracket and contact the end of the bottom support member 500.

Figure 8:
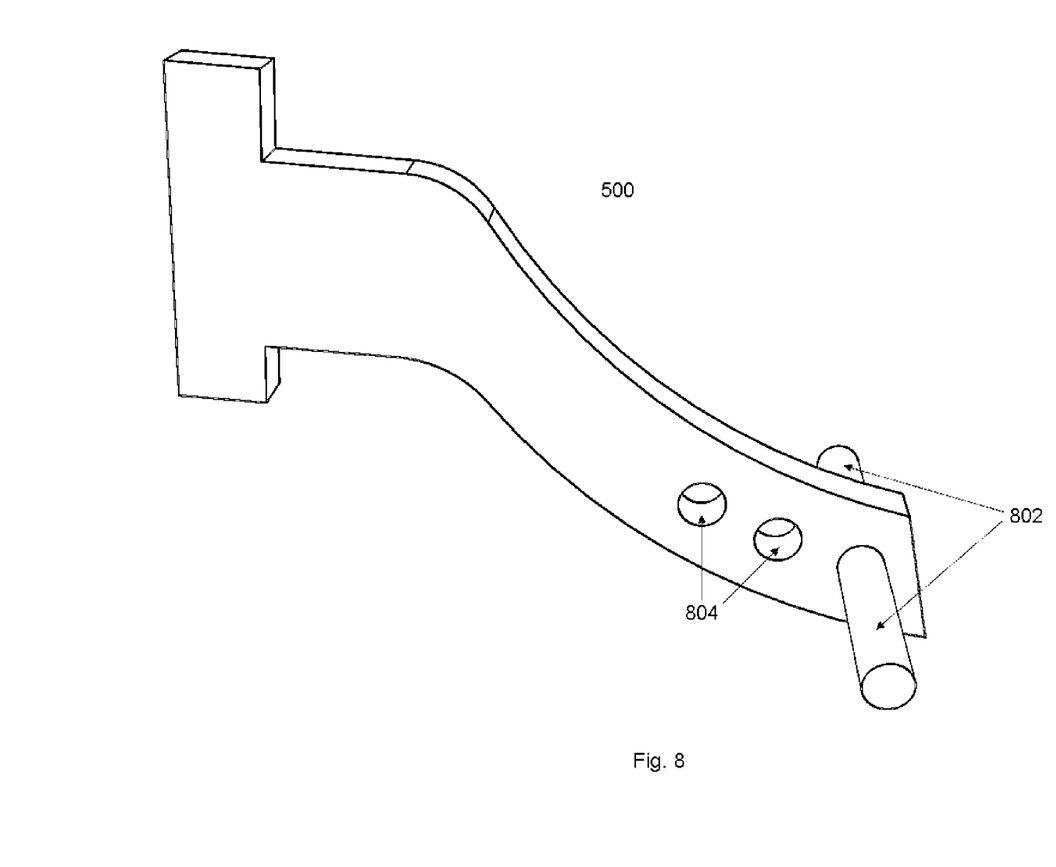
FIG. 8 is a perspective view of a bottom support member with a post jaw support.

In an alternative embodiment, a cross-member 802 is attached to the bottom support member 500. The cross member 802 is substantially perpendicular to the length of the bottom support member 500 and substantially level. If the length of bottom support member 500 defines the x-axis, the cross-member 802 lies in the substantially the y-axis. The cross-member 802 is configured to support the lower jaw (mandible) when a skull with an attached mandible is placed on the mounting bracket. The cross-member 802 is configured with sufficient length that it extends to or beyond the mandible. Installing a skull with a mandible on the mounting bracket such that the lower jaw rests on the cross-member avoids the need to wire or glue the jaw closed when displaying the skull.

Figure 9:
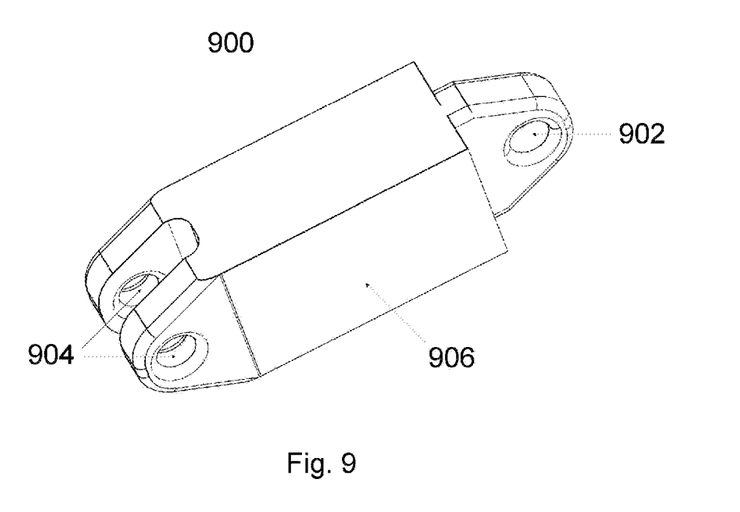
FIG. 9 is a perspective view of an extensions which may be installed on the bottom support member.

In certain embodiments, the length of the bottom support member 500 is insufficient to orient the skull in a favorable orientation. In this case, one or more extensions 900 may be installed on the bottom support member 500 to increase the effective length of the bottom support member. An extension is preferably comprised of a lateral member 906, a bottom support attachment feature 904, and a pivot hole 902. The pivot hole 902 is preferably configured so skull leveling member 600 may be attached to the extension just as the skull leveling member 600 may be installed to the bottom support member 500.

Figure 10:
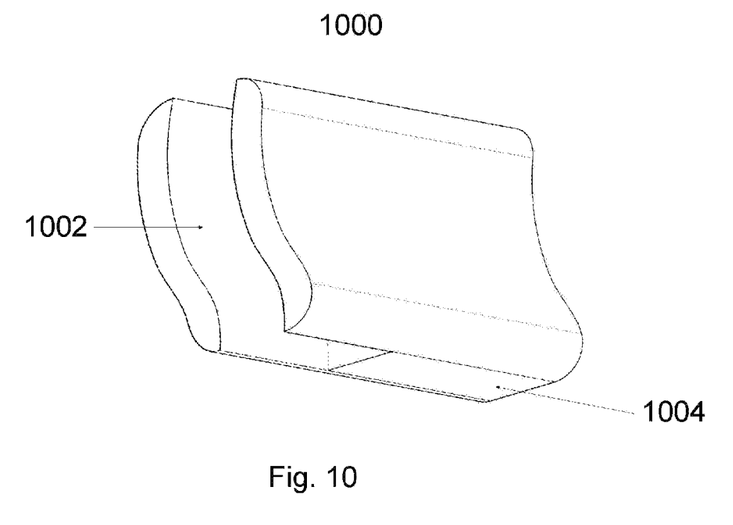
FIG. 10 is a perspective view of a spacer which may be installed on a top support member.

In certain situations, such as when a skull is to be installed near the corner of a room, it is desirable to install a skull in an orientation not perpendicular to the base. In this case, a spacer 1000 may be installed on a top support member 400. The spacer 1000 preferably is configured with a slot 1002 which forms a friction fit when slid over a top support member 400. The spacer 1000 is also preferably configured with a solid region which generally aligns with the skull retention 408. The spacer 1000 fits over a top support member 400 and the length of the spacer moves the effective location of the skull retention 408 closer to the base. Moving the effective location of the skull retention 408 closer to the base causes a skull resting on the top support members 400 to lean in that direction.

In an alternative embodiment, the invention further comprises an optional wedge. The faces of the wedge are the approximate shape and size of the back of the base. The wedge has holes configured to align with holes in the body. When the wedge is installed between the back of the bracket and the surface, the angle between the base and surface is altered to tip the bracket up or down. The wedge may further contain features which are configured to interface with features on the back of the body to aid in alignment or reduce slippage between the wedge and body.

SEQUENCE LISTING

Not Applicable

What is claimed is:
1. A skull mounting bracket article of manufacture configured to support and display a skull comprising:
   a) a body comprising:
      1) a means for attaching the body to a substantially vertical surface, and
      2) a means for attaching a plurality of support members to the body, and
   b) at least two top support members attached to the body configured to resist the skull resting on the top support members from leaning away from the body at the points of contact between the skull and the top support members wherein:
      1) at least a portion of the top support members farther from the body extends above a portion of the support members nearer the body, and
      2) the top support members are pivotally attached to the base such that the distance between the ends of the top support members not attached to the body is variable.

2. The skull mounting bracket of claim 1 wherein:
   said means for attaching said body to said substantially vertical surface comprise a plurality of holes passing through said body.

3. The skull mounting bracket of claim 1 wherein said top support members further comprise:
   one or more spacers configured to be installed on one of the top support members between the base and the end of the top support member farthest from the body.

4. The skull mounting bracket of claim 1 further comprising:

a bottom support member configured to resist the skull resting on the bottom support member from leaning toward the body at the point of contact between the bottom support member and the skull wherein the bottom support member extends outward from the base.

5. The skull mounting bracket of claim 4 wherein the bottom support member further comprises:
one or more members configured to be attached to an end of the bottom support member opposite the base thereby increasing the effective length of the bottom support member.

6. The skull mounting bracket of claim 4 wherein the bottom support member further comprises:
a leveling member pivotally attached near the end of the bottom support member configured to rotate around a generally horizontal axis parallel to the base.

7. The skull mounting bracket of claim 6 wherein the leveling member further comprises:
a generally flat surface configured to contact a skull resting on the bottom support member.

8. The skull mounting bracket of claim 4 wherein the bottom support member further comprises:
a cross member lying in a generally horizontal axis, parallel to the base, attached near the end of the bottom support member extending from the bottom support member in two directions.

9. The skull mounting bracket of claim 8 wherein the bottom support member further comprises:
a plurality of attachment locations configured to accept the attachment of said cross member.

10. The skull mounting bracket of claim 1 wherein:
the body is comprised of a plurality of substantially flat plates.

11. The skull mounting bracket of claim 10 wherein the plurality of substantially flat plates further comprise:
a back plate configured to be installed adjacent a vertical surface to which the skull mounting bracket is installed which prevents the at least two top support members from contacting the vertical surface.

12. The skull mounting bracket of claim 11 wherein the plurality of substantially flat plates further comprise:
a front plate configured to be installed farthest from a vertical surface to which the skull mounting bracket is installed which prevents the at least two top support members from detaching from the skull mounting bracket.

13. The skull mounting bracket of claim 12 wherein said front plate is further configured:
to cause the at least two top support members to lean outward relative to a line passing vertically through the center of a front of the base.

14. The skull mounting bracket of claim 12 wherein the plurality of substantially flat plates further comprise:
an interior plate containing a plurality of holes having a width and depth greater than that of one or more respective regions of the at least two top support members configured to be installed in said holes such that the respective regions of the at least two top support members may pivot laterally when the at least two top support members have been passed through the front plate and the interior plate is installed between the back plate and front plate.

* * * * *